United States Patent
Banzai

[19]

[11] Patent Number: 6,080,953
[45] Date of Patent: Jun. 27, 2000

[54] POWER SUPPLY DEVICE FOR ELECTRICAL DISCHARGE MACHINING

[75] Inventor: Masato Banzai, Tokyo, Japan

[73] Assignee: Mitsubishi Denki Kabushiki Kaisha, Tokyo, Japan

[21] Appl. No.: 08/813,939

[22] Filed: Mar. 3, 1997

[30] Foreign Application Priority Data

Jul. 24, 1996 [JP] Japan ................................. 8-194711

[51] Int. Cl.⁷ .............................. B23H 1/02; B23H 7/02
[52] U.S. Cl. ..................................... 219/69.13; 219/69.12; 361/698
[58] Field of Search ............................. 219/69.12, 69.13, 219/69.14; 361/698, 699, 717; 165/80.4, 104.33

[56] References Cited

U.S. PATENT DOCUMENTS

| | | | |
|---|---|---|---|
| 5,028,989 | 7/1991 | Naganuma et al. | 165/104.33 |
| 5,166,489 | 11/1992 | Huff, Jr. et al. | 219/69.12 |
| 5,316,077 | 5/1994 | Reichard | 165/104.33 |
| 5,420,753 | 5/1995 | Akamatsu et al. | 361/699 |

FOREIGN PATENT DOCUMENTS

| | | |
|---|---|---|
| 59-73224 | 4/1984 | Japan . |
| 2-66922 | 5/1990 | Japan . |
| 4-226834 | 8/1992 | Japan . |
| 5-162021 | 6/1993 | Japan . |
| 8-174339 | 7/1996 | Japan . |

*Primary Examiner*—Geoffrey S. Evans
*Attorney, Agent, or Firm*—Sughrue, Mion, Zinn, Macpeak & Seas, PLLC

[57] ABSTRACT

The power supply device for electrical discharge machining includes circuit component elements for converting a voltage from a power supply to a given pulse voltage which can be supplied to a minute gap between an electrode and a workpiece so that electrical discharge can be generated in the minute gap; a substrate on which the circuit component elements are mounted; a highly thermally conductive metal piece member disposed opposed to the substrate and including a cavity portion therein, the cavity portion being fittable with the circuit component elements or being capable of holding the circuit component therein; and, cooling appratus for cooling heat generated by the circuit component elements and conducted to the metal piece member by use of a machining liquid supplied to the minute gap as a cooling medium.

11 Claims, 15 Drawing Sheets

POWER SUPPLY DEVICE FOR ELECTRICAL DISCHARGE MACHINING

BACKGROUND OF THE INVENTION

The present invention relates to a power supply device for electrical discharge machining and it is an object of the invention to provide a power supply device for electrical discharge machining at a reduced size and cost.

FIG. 15 shows a conventional wire electrical discharge machining device having a wire electrode 1, a workpiece 2, and upper and lower electric energizers, 3a and 3b respectively, used to slidingly apply electric power, which is supplied from a pulse power supply unit 4 through a power supply cable 5, to the wire electrode 1. Also, the upper and lower electric energizers 3a and 3b are disposed within upper and lower machining liquid injection nozzles 13a and 13b, respectively.

A numerical value control unit 6 drives a machining table. FIG. 15 also shows a machining liquid vessel 11, a machining liquid tank 7, a pump 8 used to supply a machining liquid, and a cooling device 9 for cooling the machining liquid. These parts cooperate together in forming a machining liquid supply system. By means of the machining liquid supply system, the machining liquid is supplied so that it is branched into and stored in a liquid section 12a of the machining vessel 11 and into a liquid section 12b, where the machining liquid is to be supplied to a machining gap formed between the wire electrode 1 and workpiece 2 in which electric discharge is generated.

A bed 14 is used to support the workpiece 2 thereon.

Next, the operation of the above-mentioned conventional wire electrical discharge machining device will be described.

Initially, while injecting the machining liquid 12a to the wire electrode 1, a pulse voltage is applied between the wire electrode 1 and workpiece 2. As a result, in mutually opposed minute gaps between the electrode 1 and workpiece 2, the workpiece 2 melts and flies around due to the vaporization and explosion of the machining liquid 12a and the thermal energy generated when electricity is discharged.

The mutually opposed minute gaps are kept constant, and the relative movements of the wire electrode 1 and workpiece 2 in continuous electric discharge are normally controlled according to a control method in which an X-Y cross table (not shown) is controlled by the numerical value control device 6 that uses a difference between the average machining voltage of a machining gap and a target servo voltage.

If the electric discharge is repeatedly generated and the X-Y cross table is controlled in this manner, then the machining liquid vessel 11, bed 14 and workpiece 2 respectively connected to the X-Y cross table are controlled simultaneously, so that machining grooves are formed successively to thereby be able to machine the workpiece 2 into an arbitrary shape.

FIG. 16 shows the structure of the pulse power supply unit 4 which is used to supply a pulse voltage to the wire electrode 1 through the upper and lower electric energizers 3a and 3b.

FIG. 16 shows a printed substrate 41 on which there are mounted circuit component elements such as resistors 44, capacitor 45, transistors 46, and diodes 47. Heat radiating fins 42 are connected to the printed substrate 41 in order to cool the transistors 46 and diodes 47, which are the main heat generating elements. Fans 43 are used to forcibly air cool the main parts of the circuit component elements in order to enhance the heat radiation efficiency of the heat radiating fins 42, and 48 stands for a box member.

In the pulse power supply unit 4, then, there is a forced air cooling method in which the main heat generating elements of the unit 4, that is, the transistors 46 and diodes 47, are cooled by the fans 43.

In FIG. 16, arrows represent the flow of the air sent from the fans 43.

FIG. 17 is an electric circuit diagram which shows an electrical discharge circuit.

In FIG. 17, a waveform i, which is supplied from a power supply E due to the switching operation of a transistor TRI, is decided according to an equation 1 relating to a circuit inductance L, a resistor R, and a power supply voltage $E_1$. For this reason, it is necessary to reduce the RL component of a cable used for this purpose and normally a coaxial cable is used or a plurality of cables are connected together in parallel to one another.

$$i = E_1(1 - e^{-RT/L})/R \qquad \text{Equation 1}$$

FIGS. 18A and 18B are section view of an electric elements storage member (also referred to herein as a gap box) which is disclosed in the Unexamined Japanese Patent Application Publication No. Hei. 4-226834. The electric elements storage member is used to store therein an isolation diode out of an electric power module for supplying a desired machining pulse to a wire electrode and a workpiece. The storage member is disposed adjacently to a machining gap and the wire electrode. FIG. 18A is a longitudinal section view of the gap box, while FIG. 18B is a plane section view thereof.

FIGS. 18A and 18B show coaxial cables 21, conductive elements 22 used to connect the coaxial cables 21 to diode assemblies 23, an insulation plate 24, an electric conduction member 25, a lower wire guide structure 26, an injection conduit 27 used to form a flow passage for feeding an insulating machining liquid not only to a wire guide and but also to a machining liquid injection member 26 which injects a machining liquid to a machining gap, and an elongated hole 28.

The operation of the above-mentioned electric elements storage member, or gap box, will now be described.

An output signal pulse is sent to the gap box 20 through the coaxial cable 21 provided within a lower arm 29 to a pair of diode assemblies 23.

The intermediate portion of each of the diode assemblies 23 includes in the middle portion thereof an isolation diode 23a having an anode connected to the conductive element 22, while the cathode of the isolation diode 23a is connected to an electrically conductive central block.

During the electrical discharge machining time, a machining pulse having a given waveform is supplied through the coaxial cables 21 to the diode assemblies 23. Since the polarity of the machining pulse is negative, the machining pulse signal is allowed to pass through the isolation diodes 23a to the electrically conductive central block. The machining pulse signal flows through the electric conduction member 25 and lower wire guide structure 26 of the gap box 20.

In order to inject the machining liquid to the machining gap and workpiece, the elongated hole 28 is formed so that it extends through the insulation plate 24 and electric conduction member 25 and reaches the wire guide structure 26. The elongated hole 28 forms a cooling mechanism with respect to the isolation diodes 23a and the other electric elements of the gap box 20.

The conventional power supply device for wire electric discharge machining, as described above, includes fins for heat radiation and fans for forced air cooling and is included with the printed substrate within the box member, so that the volume of the power supply device is excessively large.

Because the power supply device is large, it must be disposed apart from the electrical discharge machining gap, so that the power supply cable for wiring must be increased in length.

Further, since the air cooling fans have a low reliability, it is necessary to provide a filter to prevent dust from invading into the interior of the box member.

In order to solve these problems, one method transports the heat of the interior of the closed box member to the outside thereof by use of a heat pipe where it is forcibly cooled by the outside air. However, the effect of reduction in the occupied volume of the power supply device is minimal and the cost of the power supply device is increased.

In an electrical discharge machining device disclosed in the above-mentioned Unexamined Japanese Patent Application Publication No. Hei. 4-226834, the isolation diodes disposed in the interior of the gap box are cooled by flowing the machining liquid into the elongated hole. However, by this method, as shown in FIG. 18B, only the temperatures of the connecting portions of the isolation diodes can be lowered. There is no reduction in the temperatures of the remaining portions of the isolation diodes, in which generation of heat is greatest, resulting in a poor cooling characteristic of the power supply device.

Further, no solution has been provided for a case in which the machining liquid leaks into the isolation diode side due to corrosion of the elongated hole.

SUMMARY OF THE INVENTION

The present invention aims at eliminating the drawbacks found in the above-mentioned conventional power supply devices for electrical discharge machining. A first object of the invention is to provide a power supply device for electrical discharge machining which can cool circuit component elements without using any heat radiating fin or any forced air cooling fan.

A second object of the invention is to provide a molding material which is capable of enhancing the cooling efficiency of the power supply source.

A third object of the invention is to provide a power supply device for electrical discharge machining which can be water-proofed for liquid cooling the circuit component elements.

A fourth object of the invention is to provide a power supply device for electrical discharge machining which with enhanced cooling characteristics.

A fifth object of the invention is to provide a power supply device for electrical discharge machining in which the power supply path to a wire electrode and to a workpiece is shortened so that the electrical discharge machining energy to be supplied can be kept constant.

A sixth object of the invention is to provide a power supply device for electrical discharge machining which can reduce the power loss of the power supply path.

A seventh object of the invention is to provide a power supply device for electrical discharge machining with a reduced circuit inductance.

In attaining the above objects, according to the invention, there is provided a power supply device for electrical discharge machining, comprising: circuit component elements for converting a voltage from a power supply to a given pulse voltage which can be supplied to a minute gap between an electrode and a workpiece so that electrical discharge can be generated in the minute gap; a substrate on which the circuit component elements are mounted; a highly thermally conductive metal piece member disposed opposed to the substrate and including a cavity portion therein, the cavity portion being fittable with the circuit component elements or being capable of holding the circuit component elements therein; and, cooling means for cooling heat generated by the circuit component elements and transmitted to the metal piece member, by use of a machining liquid supplied to the minute gap as a cooling medium.

Also, according to the invention, there is provided a power supply device for electrical discharge machining, wherein a molding material having a high thermal conductivity is loaded into a gap formed between the circuit component elements mounted on the substrate and the inner wall surface of the cavity portion of the metal piece member.

In a power supply device for electrical charge machining according to the invention, there is a molding material which contains a filler mixed therewith. The mother material of the molding materials, can include one or more of epoxy resin, silicone resin, urethane resin, and polyester resin, each flowable at normal temperature or in a heated condition. The filler can include one or more of copper powder, aluminum powder, silver powder, gold powder, iron powder, stainless steel powder, brass powder, alumina powder, magnesium powder, crystal silica powder, aluminum nitride powder, silicon oxide powder, beryllium powder, silicon powder, boron nitride powder, zirconium silicate powder, silicon carbide powder, and diamond powder.

In the power supply device, the metal piece member to be cooled by the cooling means is in part exposed to the outer-most surface of the power supply device. Both the circuit component elements mounted on the substrate and the substrate are moldingly formed into a united body, that is, they are sealed by the molding material before they are formed into a united body.

According to another aspect of the invention, the power supply device is immersed in the machining liquid stored within the machining liquid vessel, in which electrical discharge is generated between the electrode and workpiece.

According to another aspect of the invention, on the outer-most surface of the metal piece member or the moldingly formed body that is in contact with the machining liquid, a raised and recessed (undulated) portion is formed to thereby increase the surface area of the metal piece member or the moldingly formed body with the machining liquid.

According to another aspect of the invention, the substrate and the circuit component elements to be mounted on the substrate are divided into an arbitrary number of units and the units are then arranged radially with an air gap formed in the central portion thereof, before they are enclosed or formed by molding.

According to another aspect of the invention, a wire electrode is inserted through the air gap formed in the central portion of the units, providing upper and lower wire electric energizers which are used to supply a pulse voltage to the wire electrode, and the respective units of the power supply device are arranged in a radial manner with respect to the wire electric energizers.

According to another aspect of the invention, a workpiece electric energizer, used to supply power slidingly to the workpiece, is provided in or near the molded end portion of the power supply device.

Further, a power supply device for electrical discharge machining is provided, wherein, as connecting means for connection with the wire electric energizers with the workpiece electric energizer, two thin conductive plate members disposed in parallel to each other with an insulation film inserted between them are used, and wherein one of the two conductive plate members is connected with the wire electric energizers, while the other is connected with the workpiece electric energizer.

Figure 1A:
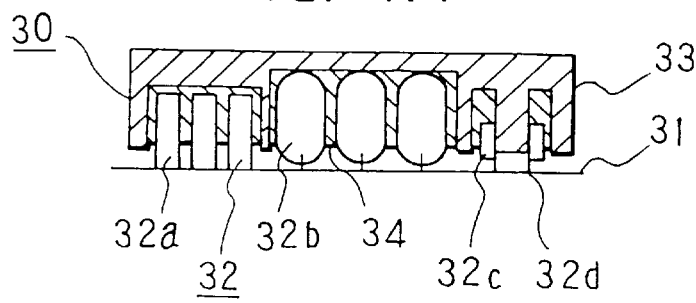
FIGS. 1A to 1D are explanatory views of a power supply device of a machining liquid cooling type according to a first embodiment of the invention.

DETAILED DESCRIPTION OF THE PREFERRED EMBODIMENTS (Embodiment 1)

FIG. 1 is an explanatory view of a first embodiment of a power supply device for electrical discharge machining, in which a power supply device forming part of a pulse power supply unit 4 and used to generate a given pulse width and a given current is cooled according to a machining liquid cooling system.

In FIG. 1, a power supply device 30 which forms part of the pulse power supply unit 4 and also sets the electric power so that the electric power has a given pulse width and a given current for use in electrical discharge machining.

FIG. 1 shows a printed substrate 31 on which circuit component elements 32 are mounted. The circuit component elements include a resistor 32a, a capacitor 32b, a transistor 32c, a diode 32d and the like.

A metal piece member 33 has in the interior thereof a recessed cavity which can be fitted with or is capable of holding therein the circuit component elements 32. A molding material 34 thermal conductivity is injected in such a manner that it fills up the portions of the cavity that are not in contact with the metal piece member.

Figure 1B:
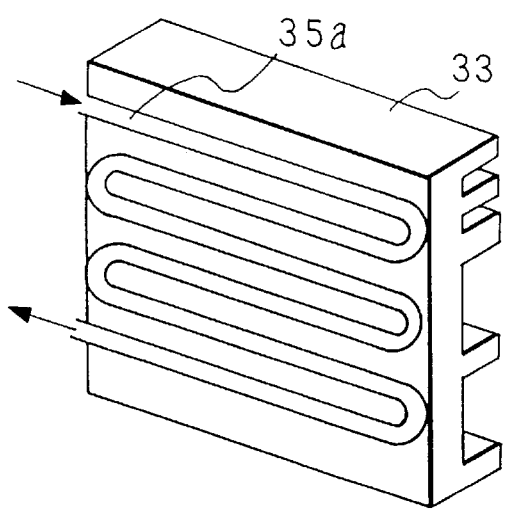
Figure 1C:
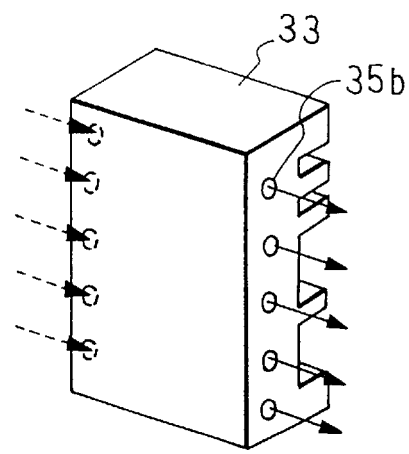

In the metal piece member 33 are a metal pipe 35a and a plurality of holes 35b used to flow the machining liquid therethrough (see FIGS. 1B and 1C).

Referring in more detail to the molding material 34, the mother material of the molding material includes one or more of epoxy resin, silicon resin, urethane resin, and polyester resin, which are respectively flowable at normal temperature or in a heated condition. A filler to be mixed with the molding material 34 includes one or more of copper powder, aluminum powder, silver powder, gold powder, iron powder, stainless steel powder, brass powder, alumina powder, magnesium powder, crystal silica powder, aluminum nitride powder, silicon oxide powder, beryllium powder, silicon powder, boron nitride powder, zirconium silicate powder, silicon carbide powder, and diamond powder, each having excellent thermal conductivity. In the case of the metal powder, an alloy powder is used, containing which contains one of the above-mentioned elements as a main component.

A method of cooling the power supply device 30 will now be described with reference to FIG. 1B.

In the power supply device 30 used for electrical discharge machining, generally, a machining current having a given pulse width and a given value is created in the operation of the circuit having component elements 32 mounted on the printed substrate 31. The machining current is supplied to a machining gap. In generating the machining current, a given pulse width to be used in electrical discharge is created by switching the power stored in the capacitor 32b using transistor 32c, and a given value is determined by resistor 32a.

The metal piece member 33 includes a recessed cavity formed at a position which corresponds to the circuit component elements 32 mounted on the printed substrate 31 in such a manner that the recessed cavity can be contacted with or can hold therein the resistor 32a, capacitor 32b, transistor 32c, and diode 32d, that is, the circuit component elements 32.

Also, the highly thermally conductive molding material 34 is injected in such a manner that it can fill up spaces between the circuit component elements 32 and the metal piece member 33, so that the printed substrate 31, circuit component elements 32, and metal piece member 33 are formed as an integral body.

The molding material 34 transmits the heat that is generated by the circuit component elements 32 to the metal piece member 33 due to the high conductivity thereof.

By supplying the machining liquid into the metal pipe 35a (see FIG. 1B) provided in the metal piece member 33, and into holes 35b (see FIG. 1C), which extend through the metal piece member 33, or by bringing the metal piece member 33 and the circuit component elements 32 into direct contact with the machining liquid surface of the machining liquid vessel 11, the metal piece member 33 and the circuit component elements 32 are cooled.

Figure 1D:
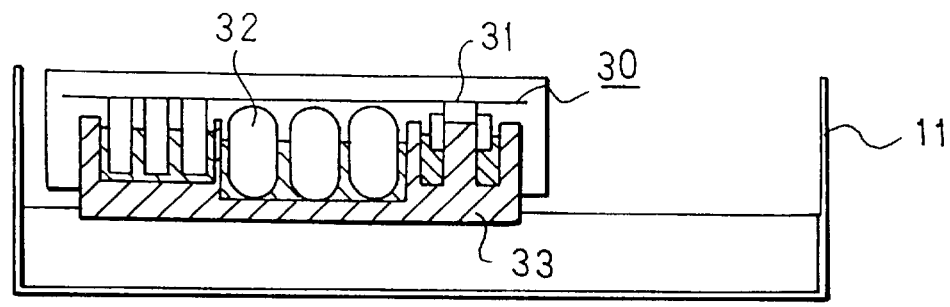

Referring to FIG. 1D, it is necessary to take waterproofing measures to prevent the printed substrate 31, circuit component elements 32 and the like from being in direct contact with the machining liquid.

In FIGS. 1A to 1D, arrows show the flows of the machining liquid.

According to the first embodiment, the circuit component elements 32, which are heat generating elements, can be cooled without using any heat radiating fin or any forced air cooling fan. This can reduce not only the size of the power supply device but also the cost.

When compared with the prior art disclosed in the above-mentioned Unexamined Japanese Patent Application Publication No. Hei. 4-226834, since the heat generated by the circuit component elements 32 is directly transmitted to the metal piece member 33 by the molding material 34 without transmitting the heat through the air or a similar intervening material, a larger amount of heat can be conducted to the metal piece member 33, which in turn improves the cooling characteristic of the power supply device.

Because parts other than the printed substrate 31 and circuit component elements 32 may be in contact with the machining liquid, a water-proofing treatment can be implemented easily.

Further, dew condensation on the power supply device is presented when the metal piece member 33 is in part contacted with the cooled machining liquid or the like.

Therefore, the circuit component elements 32 can be improved in reliability, the pulse voltage can be controlled accurately so that the machining can be executed with high precision and at high speeds, and the circuit component elements 32 can be protected against damage.

(Embodiment 2)

Figure 2:
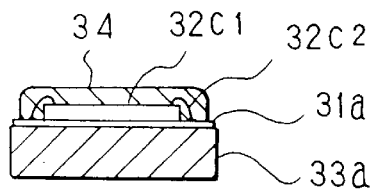
FIG. 2 is an explanatory view of a power supply device of a machining liquid cooling type according to a second embodiment of the invention, in which the transistor chip mounting portion thereof is reduced in size.

FIG. 2 is a section view of a second embodiment of the invention in which a transistor serving as a power element is mounted directly on a metal core substrate.

For reference, a transistor 32c is normally sold in a molded package or a metal can. In the second embodiment shown in FIG. 2, a chip 32c1 and a bonding wire 32c2, which are normally contained within the transistor 32c, are used as separate parts and, are die bonded and wire bonded directly to a metal core substrate 31a. Then they are molded by means of the molding material 34 as in embodiment 1, and then the metal core substrate 31a is connected to the heat radiating metal piece member 33.

Embodiment 2, in addition to the effects of the above-mentioned embodiment 1, allows the mounting density of the power element portion of the power supply device to be enhanced, which in turn makes it possible to further reduce the size of the power supply device.

(Embodiment 3)

Figure 3A:
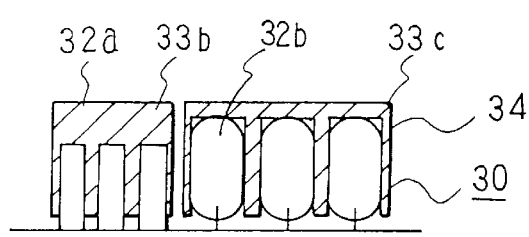
FIGS. 3A to 3C are explanatory views of a power supply device of a machining liquid cooling type according to a third embodiment of the invention, in which the cooling of a capacitor and a resistor is taken into consideration.
Figure 3B:
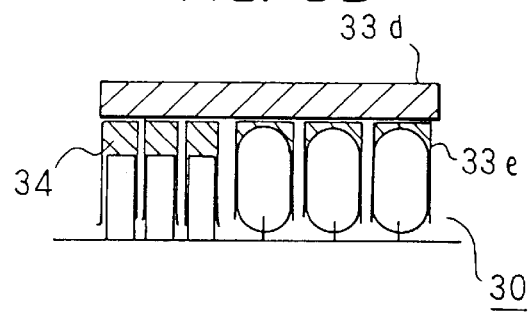
Figure 3C:
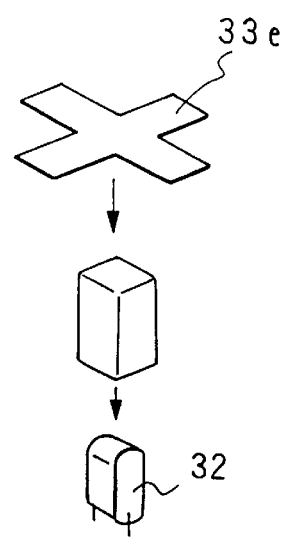

FIGS. 3A to 3C are explanatory views of a third embodiment of the invention in which individual metal piece members 33 are provided for circuit component elements 32 in order not only to cool resistors and capacitors more efficiently but also to enhance the mounting density of the circuit component elements. In particular, FIG. 3A shows metal piece member 33 having a cavity almost equal in size to the outside dimensions of the resistor 32a and capacitors 32b, where the components are tightly packed. FIGS. 3B and 3C show a case in which, in order to make use of the elasticity of metal, a cross-shaped metal piece member 33e is folded and a circuit component element 32 is connected to the folded metal piece member 33e so that the circuit component element 32 is fitted into the metal piece member 33e, and one surface of the metal piece member 33e is connected to a metal piece member 33d to be contacted with the machining liquid.

When the molding material 34, used in the embodiment 1 and having high thermal conductivity, is filled into gaps between the circuit component elements 32 and metal piece members 33b, 33c, 33d, 33e, then they can be cooled by the machining liquid similarly to embodiment 1.

According to embodiment 3, each of the metal piece members 33 to be contacted with the circuit component elements 32 is formed into a shape which can hold the circuit component elements 32 therein, or they are machined with high precision and are then fitted tightly onto the circuit component elements 32. As a result, the mounting density of the power elements portion of the power supply device can be improved, making the power supply device more compact.

(Embodiment 4)

FIGS. 4A to 4D are section views of a fourth embodiment of a power supply device according to the invention.

Figure 4A:
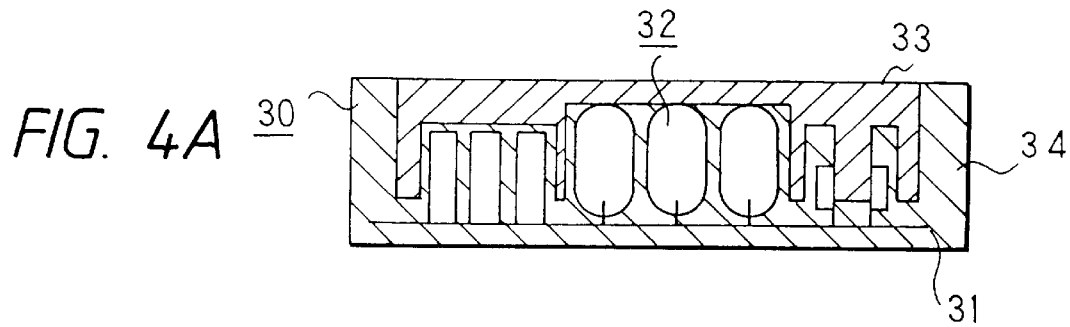
FIGS. 4A to 4D explanatory views of a power supply device of a machining liquid cooling type according to a fourth embodiment of the invention, in which the body of the power supply device is formed by use of a molding material, except for the heat radiating metal surface thereof.

According to the present embodiment 4, as shown in FIG. 4A, the power supply device 30 described in the embodiment 1 is molded, using the molding material 34, together with the printed substrate 31 into a completely closed integral body which is not exposed except for the heat radiating surface of the metal piece member 33 and the surface of the power supply device 30 from which signal wires to be connected with the power supply cable 5 and numerical value control device 6 are drawn out collectively, that is, except the terminal bed 36 and the like.

Figure 4B:
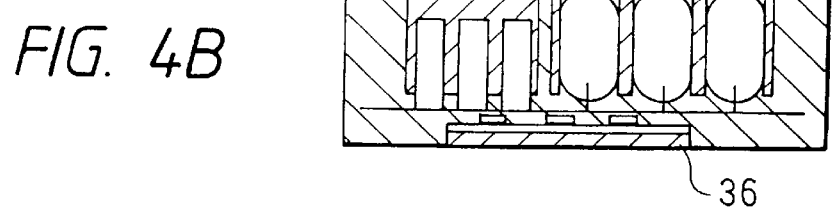
Figure 4C:
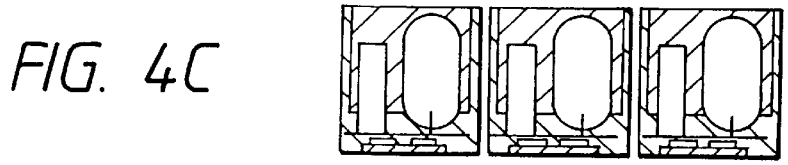

FIG. 4B also shows the power supply devices described in embodiments 2 and 3 formed in combination into a united body, and FIG. 4C shows power supply device 30 divided into a plurality of units, where and the units are each molded using the molding material 34.

Figure 4D:
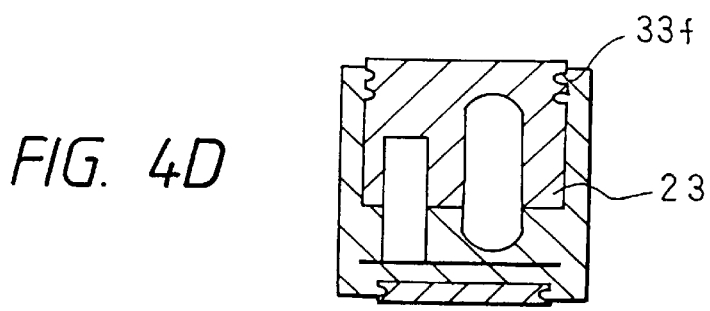

To increase the connecting stability of the boundary portion between the molding material 34 and metal piece member 33, as shown in FIG. 4D, either a raised and recessed portion 33f is formed on the surface of the metal piece member 33, or the surface of the metal piece member 33 is roughened to thereby increase the connecting strength of the two parts. This improves air tightness and durability, and reduces age deterioration of the power supply device.

According to the present embodiment 4, even when portions of the power supply device other than the wiring portion connected with the wires from the printed substrate 31, are contacted with the machining liquid, the machining liquid is prevented from touching the circuit component elements 32 themselves. This can solve the waterproofing related problems found in conventional power supply devices.

Further, it is also possible to prevent dew condensation within the power supply device which otherwise could occur when part of the metal piece member 33 is contacted with the cooled machining liquid.

(Embodiment 5)

Figure 5A:
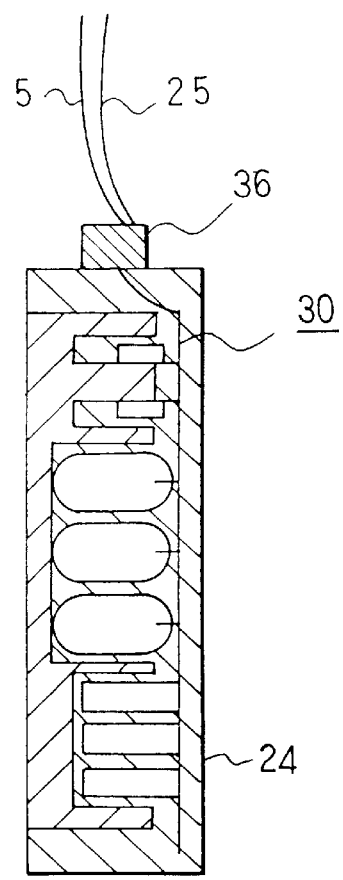
FIGS. 5A and 5B are explanatory views of a power supply device of a machining liquid cooling type according to a fifth embodiment of the invention, in which the terminal portion thereof is disposed on one surface of a moldingly formed integral body.
Figure 5B:
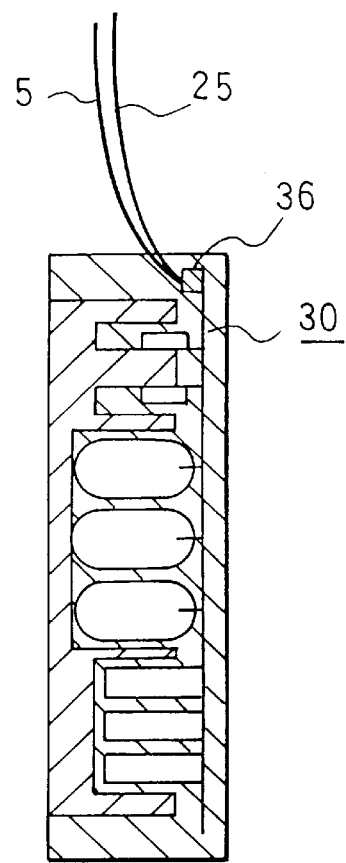

FIGS. 5A and 5B are section views of a fifth embodiment of a power supply device according to the invention.

In embodiment 5, the terminal beds 36, used to connect the power supply wires or cables 5 and signal wires 25, provided on the printed substrate 31, are disposed collectively on the outside of one surface of the molded integral body or power supply device 30 as described in the embodiment 4, and then the power supply wires 5 and signal wires 25 are connected to the corresponding terminal beds 36 (see FIG. 5A), or the terminal beds 36 are formed by the molding material 34 together with the power supply device 30 and the power supply wires 5 and signal wires 25 are then respectively drawn out from their corresponding terminal beds 36 through one surface of the power supply device 30 (see FIG. 5B).

Figure 6:
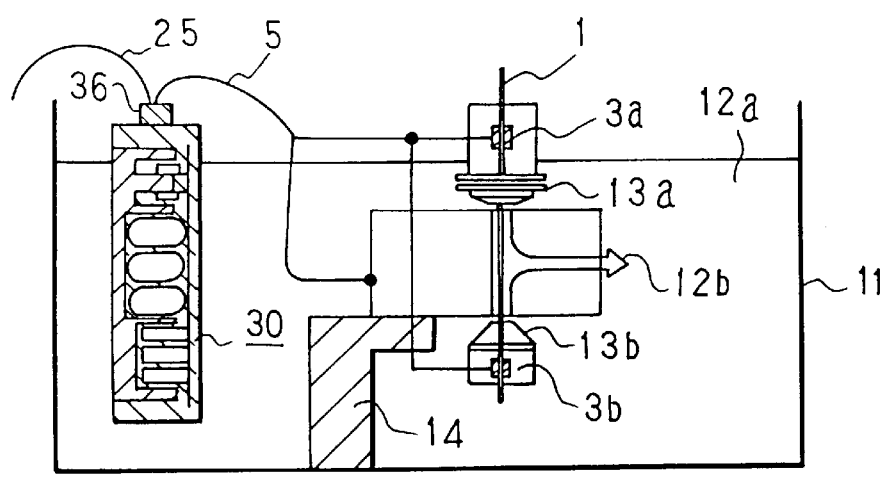
FIG. 6 is an explanatory view of a power supply device of a machining liquid cooling type according to the fifth embodiment of the invention, in which the moldingly formed integral body is immersed a machining liquid stored in a machining liquid vessel.

FIG. 6 is a structural view of the structure of embodiment 5 when the power supply device 30 shown in FIGS. 5A and 5B is actually immersed in the machining liquid.

In the present embodiment, the power supply device 30 shown in FIGS. 5A and 5B is situated at a position which does not limit a machining area between the wire electrode 1 and the workpiece 2 in the machining liquid vessel 11, so that portions of the power supply device 30 other than the surface for drawing out the power supply wires 5 and signal wires 25, are immersed in the machining liquid 12a.

If the machining liquid 12a is made to circulate within the machining liquid vessel 11 and the circulating flow of the machining liquid 12a is made to touch the surfaces of the metal piece member 33 and molding material 34, then a higher cooling effect can be expected.

Further, if there are fins provided on the above-mentioned surfaces of the metal piece member 33 and molding material 34, then the contact areas of the surface of the power supply device with the machining liquid 12a are increased, so that a still higher cooling effect can be expected.

According to embodiment 5, since the need to feed the machining liquid up to the pulse power supply unit 4 outside of the machining liquid vessel for cooling the power supply device has been eliminated, the pipe and pump that form a mechanism to feed the machining liquid to the power supply portion can be omitted, so that the power supply device can be simplified in structure.

Also, since the present power supply device is disposed adjacently to the machining area, the length of the power supply wire 5 can be shortened, the resistance values, of the circuit can be reduced, and the desired electric discharge machining energy can be maintained.

Further, by immersing the power supply device 30 into the machining liquid 12a of the machining liquid vessel 11, the machining liquid 12a is always in contact with the metal piece member 33 and molding material 34, thereby improving the cooling characteristic of the power supply device 30.

(Embodiment 6)

Figure 7A:
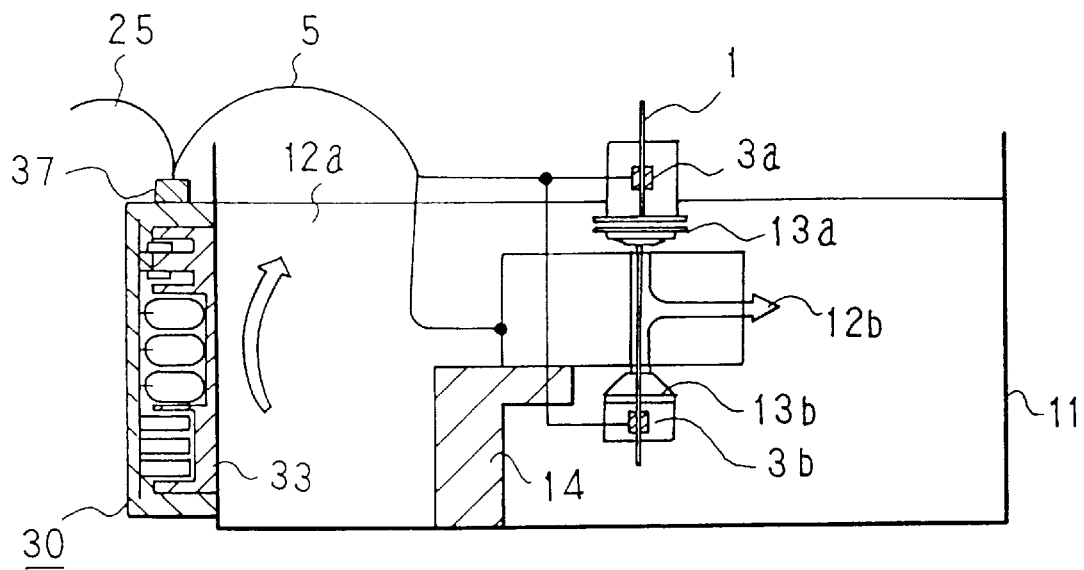
FIGS. 7A and 7B are explanatory views showing the position of a power supply device of a machining liquid cooling type according to a sixth embodiment of the invention, in which the power supply forms one surface of a machining liquid vessel.
Figure 7B:
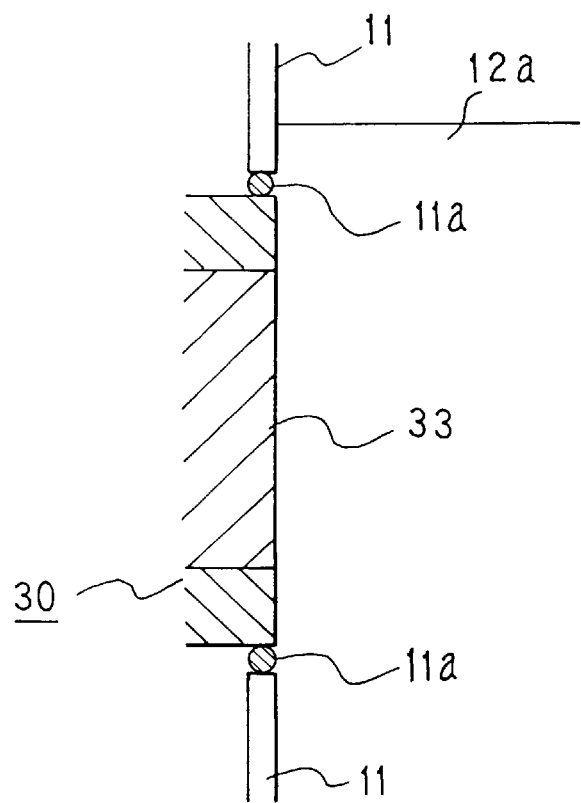

FIGS. 7A and 7B are section views of a sixth embodiment of a power supply device according to the invention.

In embodiment 6, the power supply device 30 structured as in embodiment 5 is used to form the inner surface of the machining liquid vessel 11.

As shown in FIG. 7B, the metal piece member 33 side of the power supply device 30 is used to form the inner surface of the machining liquid vessel 11 in which the machining liquid 12a is stored.

Referring to a concrete method for forming the structure shown in FIG. 7B, first a hole is formed in the portion of the machining liquid vessel 11 corresponding to the contact portion of the metal piece member 33 with the power supply device 30. Next, the power supply device 30 is fitted into the hole, and a gap between the power supply device 30 and the hole is sealed by a sealing member 11a such as rubber, resin or the like to prevent leakage of the machining liquid, thereby allowing the heat radiating surface of the metal piece member 33 to always form the inner wall surface of the machining liquid vessel 11.

Further, by circulating the machining liquid within the machining liquid vessel 11 and causing the circulating flow of the machining liquid to come into contact with the surfaces of the metal piece member 33 and molding material 34, a higher cooling effect can be expected.

According to embodiment 6, since the need to feed the machining liquid up to the power supply portion outside of the machining liquid vessel for cooling the power supply device has been eliminated, the pipe and pump that form a mechanism for feeding the machining liquid to the power supply portion can also be eliminated, so that the power supply device can be simplified in structure.

Where the present power supply device is disposed adjacent to the machining area, the length of the power supply wire 5 can be shortened, the resistance values of the circuit can be reduced, and the desired electric discharge machining energy can be maintained.

Further, by immersing the power supply device 30 into the machining liquid 12a of the machining liquid vessel 11, the machining liquid 12a is allowed to be always in contact with the metal piece member 33 and molding material 34, thereby being able to improve the cooling characteristic of the power supply device 30.

(Embodiment 7)

FIGS. 8A to 8D are section views and a side view of embodiment 7 of a power supply device according to the invention.

In embodiment 7, the power supply device 30, molded into an integral body as in embodiment 4, is formed in a cylindrical shape or in a polygonal shape and is disposed within or adjacent to a machining liquid injection nozzle.

Referring to FIGS. 8A to 8D, although an upper electric energizer will be described, the same description applies to a lower electric energizer except that the position thereof is inverted.

Figure 8A:
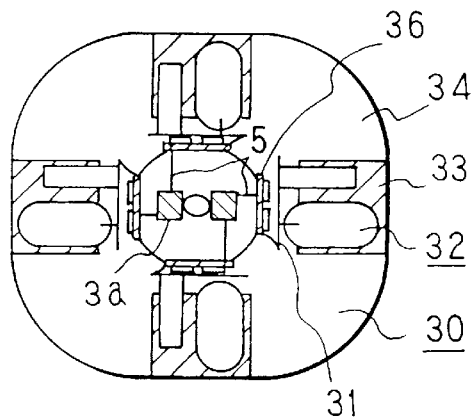
FIGS. 8A to 8D are explanatory views of a power supply device of a machining liquid cooling type according to a seventh embodiment of the invention, showing the shape of a moldingly formed integral body.
Figure 8B:
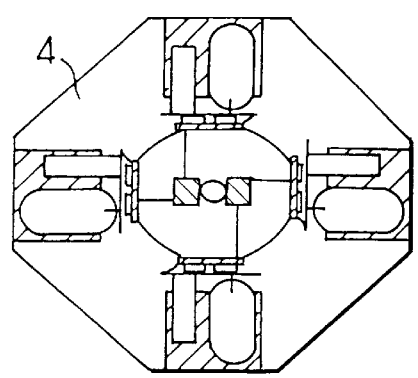

FIGS. 8A and 8B show a power supply device 30 having four units, each having a printed substrate 31. As shown in these figures, the units are disposed symmetrically so that the terminal beds 36 of respective units are arranged opposed to each other, and the electric power is supplied from the terminal beds 36 through the power supply wires 5 to the upper and lower electric energizers 3a. In particular, FIG. 8A shows the power supply device 30 in which the four units thereof are arranged in a substantially cylindrical shape, while FIG. 8B shows the power supply device 30 in which the four units are arranged in a polygonal shape.

Figure 8C:
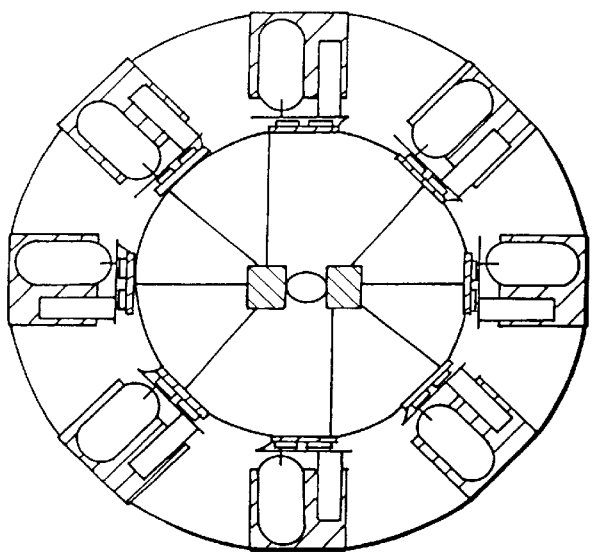

Also, FIG. 8C shows a power supply device which is composed of 8 units, each having a printed substrate 31.

Figure 8D:
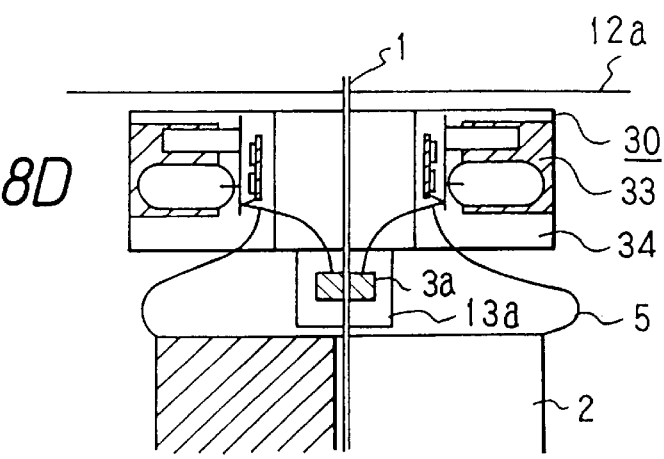

Further, FIG. 8D shows a side section view of the power supply device 30 according to embodiment 7.

FIG. 8D shows an air gap formed in the central portion (the portion where the terminal beds 36 are arranged opposed to each other) of the cylindrical or polygonal power supply device 30, and the wire electrode 1 is to be inserted through the air gap.

According to embodiment 7, the printed substrates 31 and circuit component elements 32 are arranged symmetrically with respect to the wire electrode, with the electric energizers 3a between them. The power supply device is molded by use of the molding material 34 into a cylindrical shape or into a polygonal shape. The wires extending from the electric energizers 3a to the terminal beds 36 of the printed substrates 31, molded and disposed symmetrically with the electric energizers 3a between them can be set to be equal in length. The number of wires provided can be reduced, the resistance value of the circuit can be reduced, and the desired electrical discharge machining energy can be kept constant.

Because the power supply device 30 is arranged so that it extends radially as a whole, it is possible to reduce the loss of the power supply, in which a switching frequency has been increased to a high frequency and the peak value of a current waveform for high speed machining has been increased. This provides an efficient power supply device for electrical discharge machining.

When the power supply device is not arranged in a geometrically radial shape, an effect similar to embodiment 7 can also be obtained, provided that the power supply device is arranged in a shape which is electrically equivalent to embodiment 7.

Figure 9A:
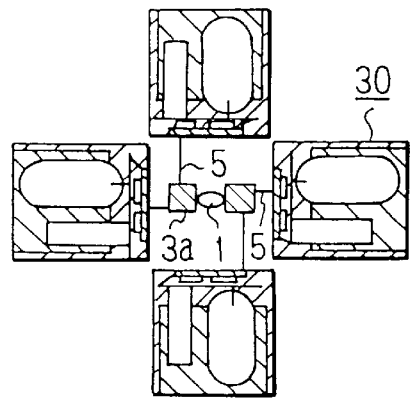
FIGS. 9A to 9C are explanatory views showing how to position a power supply device of a machining liquid cooling type according to a modification of the seventh embodiment of the invention, which includes a plurality of moldingly formed integral units.
Figure 9B:
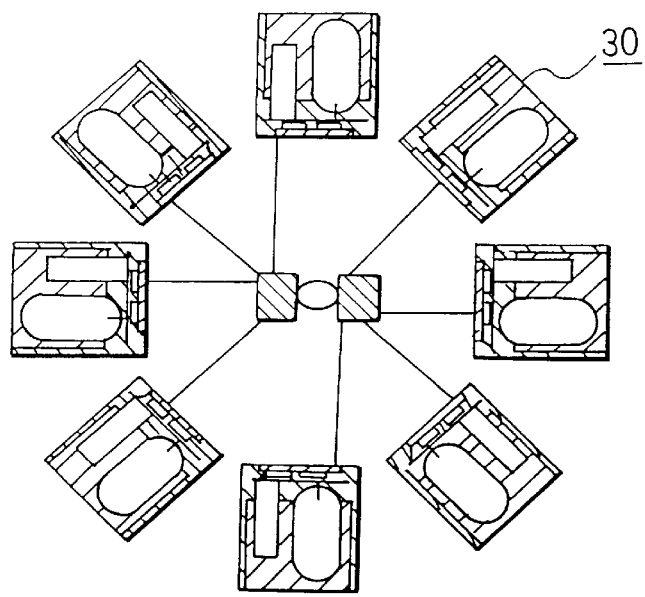
Figure 9C:
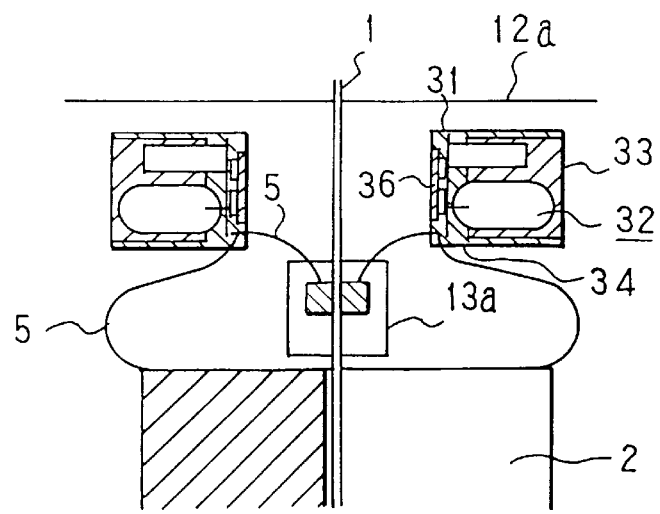

It is not always necessary to form the power supply device into the cylindrical or polygonal shape as shown FIG. 8. In FIGS. 9A to 9C, the power supply device is left divided into a plurality of units, and an air gap is formed in the central portion of the divided units and the wire electrode 1 is inserted through the air gap. The units, each including the printed substrate and circuit component elements, may be disposed within or adjacent to the machining liquid injection nozzle.

Figure 10A:
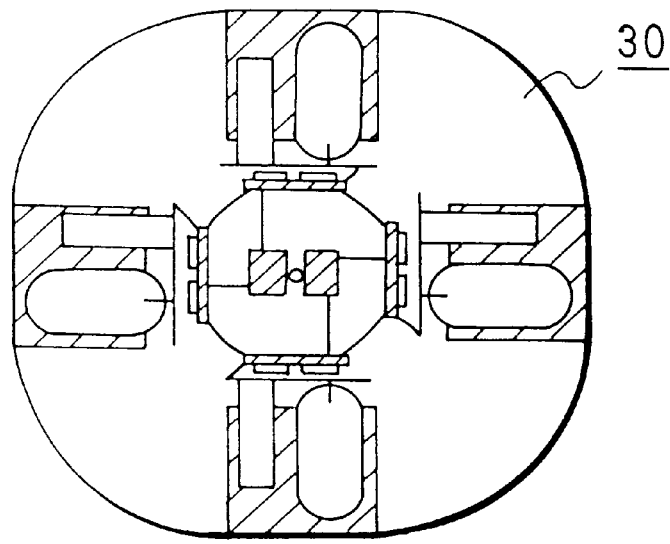
FIGS. 10A and 10B are explanatory views of a power supply device of a machining liquid cooling type according to another modification of the seventh embodiment of the invention, showing how to position the power supply wires thereof.
Figure 10B:
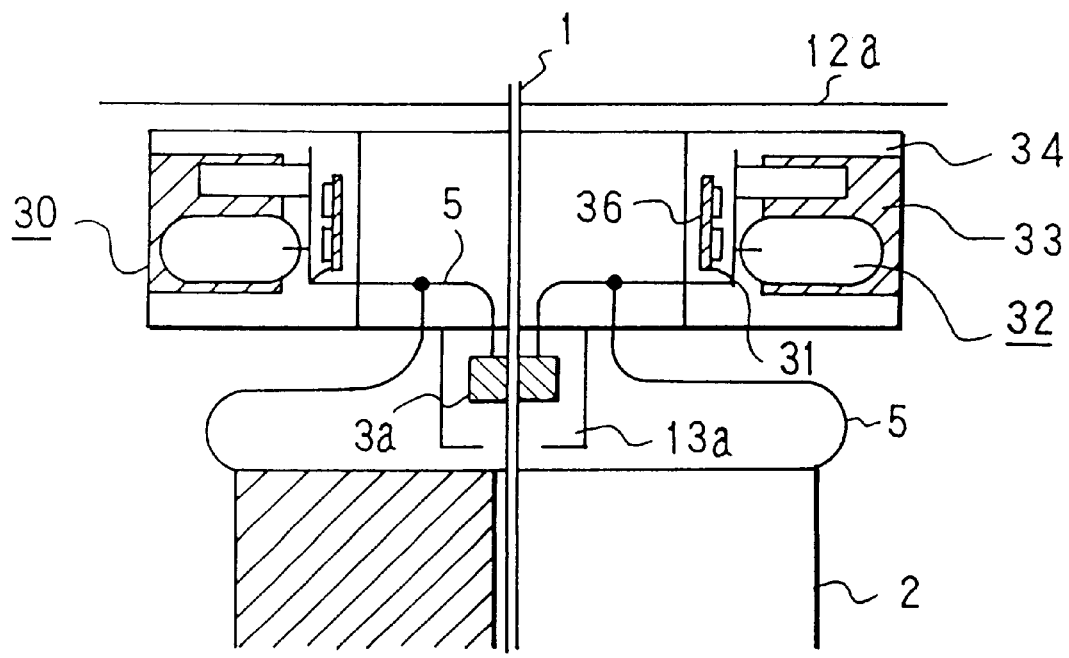

Further, in FIGS. 10A and 10B, the power supply device can also be structured such that the power supply wire 5 is drawn out to the central air gap portion for insertion of the wire electrode 1. Electric power is supplied to the electric energizers 3a to supply electric power to the wire electrode 1, and to the workpiece 2. These parts are formed into a united body, and the united body is then disposed adjacent to the electric energizers 3a.

(Embodiment 8)

Figure 11A:
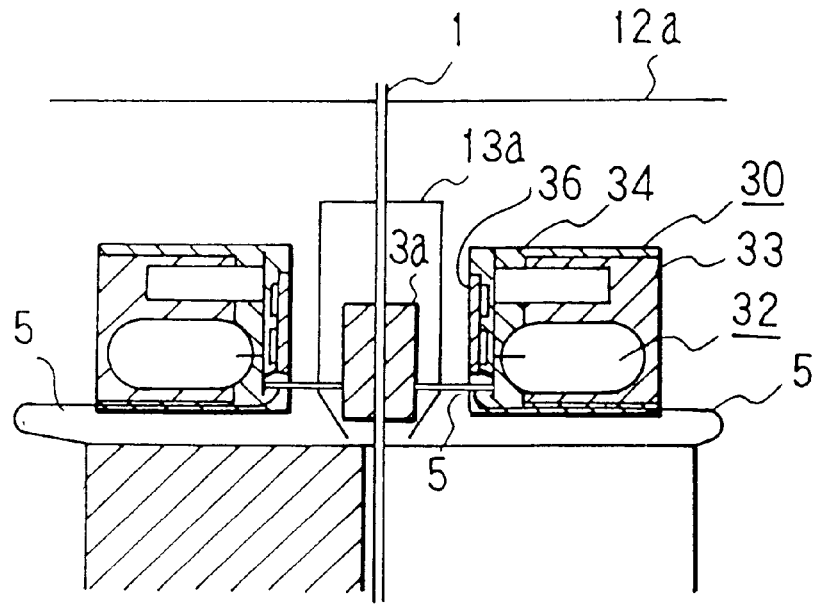
FIGS. 11A and 11B are explanatory views of a power supply device of a machining liquid cooling type according to the invention, showing the positions of electric energizers and a wire electrode used therein.
Figure 11B:
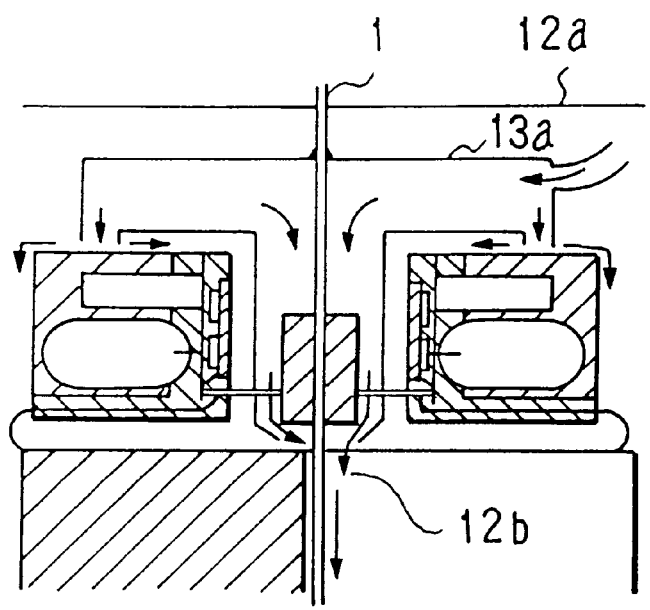

FIGS. 11A and 11B are section views of an embodiment B according to the invention.

In embodiment B, the power supply wires 5 pass through the central air gap portion of the power supply device 30 through which the wire electrode 1 is inserted, the electric energizer 3a is disposed in the central air gap portion, and the power supply wires 5 are connected to the electric energizer 3a. Also, the power supply wires 5 extend from the lower portion of the molding material 34 and are then connected to the workpiece 2, leaving with room for machining (see FIG. 11A).

Also, as shown in FIG. 11B, the shape of the machining 25 liquid injection nozzle 13 may be varied, the machining liquid to be supplied from the nozzle 13 to the machining area may be branched so that it can be used to cool the power supply device 30, and one section of the branched machining liquid may be injected to the power supply device 30 simultaneously with the injection of the other section of the branched machining liquid to the workpiece 2.

In FIG. 11B, arrows show the flows of the machining liquid.

According to embodiment 8, the necessary length of the power supply wire 5 can be shortened and the resistance and inductance of the circuit can be reduced.

Also, if the machining liquid 12b to be supplied from the nozzle 13 to the machining area is branched so that the branched liquid can be used to cool the power supply device 30, then an increase in the flow speed of the machining liquid can be expected, so that a higher cooling effect can be obtained.

(Embodiment 9)

Figure 12A:
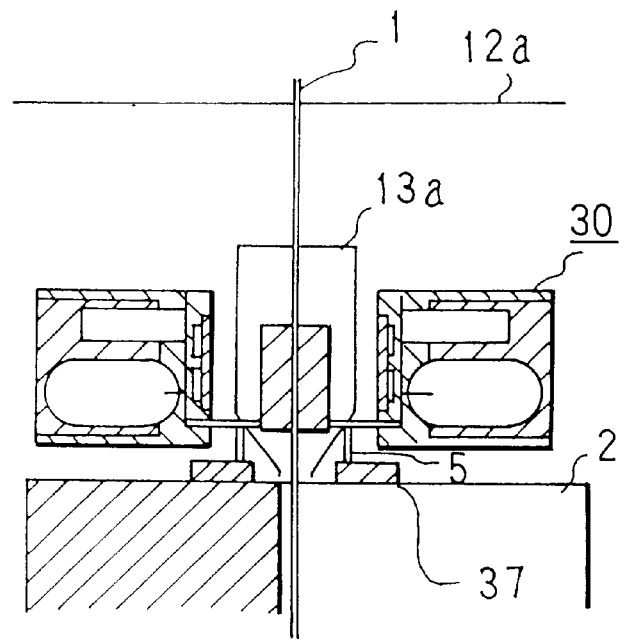
FIGS. 12A and 12B are explanatory views of a power supply device of a machining liquid cooling type according to a ninth embodiment of the invention, showing the positions of electric energizers and a wire electrode used therein.
Figure 12B:
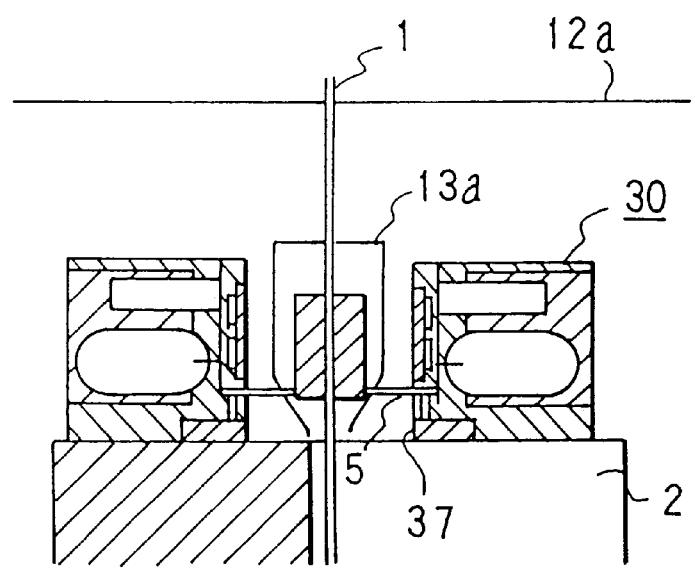

FIGS. 12A and 12B are section views of embodiment 9 of a power supply device according to the invention.

In embodiment 9, the power supply device 30 supplies power to the workpiece 2 according to a sliding power supply method as for the power supply to the wire electrode 1. That is, an electric energizer 37, formed of material that is wear resistant and has good electric conductance (such as tungsten carbide, copper carbide or the like). The electric energizer is disposed adjacent to the machining area of the surface of the workpiece 2 where electric discharge is generated, and is then connected to the workpiece 2. The power supply wire 5 extends from the central air gap side of the power supply device 30 and is connected directly to the electric energizer 37 (see FIG. 12A).

Also, the electric energizer 37 may be molded together with the workpiece 2 into a united body using the molding material 34 and the, power supply device 30 may be placed directly on the thus molded workpiece 2 (see FIG. 12B).

According to embodiment 9, the length of the power supply wire 5 can be shortened further than embodiment 8, the resistance value and inductance of the circuit can be reduced.

(Embodiment 10)

Figure 13A:
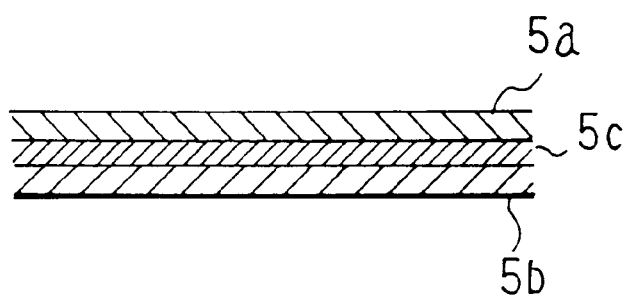
FIGS. 13A and 13B are explanatory views of a power supply device according to a tenth embodiment of the invention, showing how to arrange wires therein.
Figure 13B:
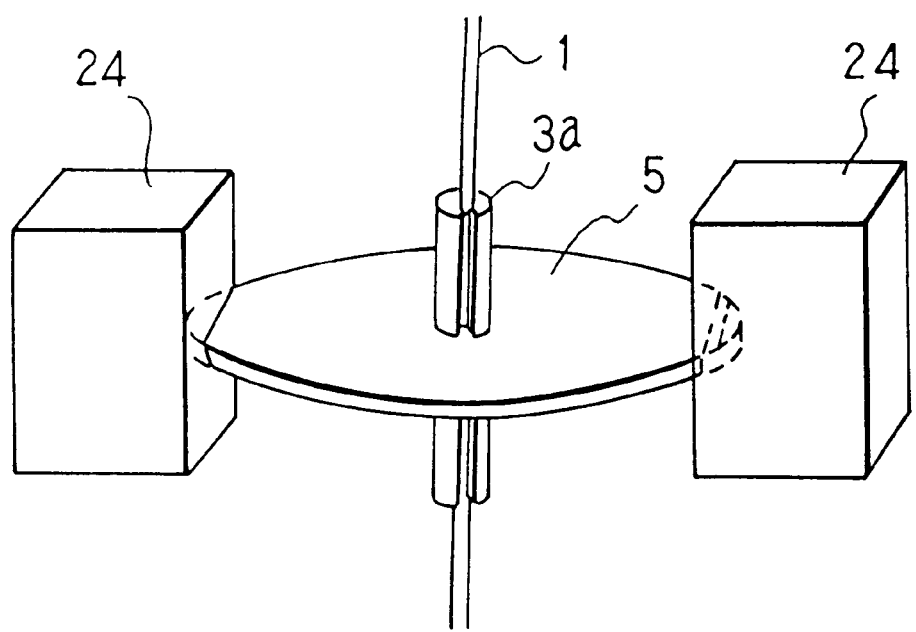

FIGS. 13A and 13B are explanatory views of embodiment 10 of a power supply device according to the invention.

In embodiment 10, in the interior of the power supply device 30, there is a wire composed of two highly conductive copper plates or copper-system alloy plates 5a and 5b which are mutually disposed in parallel to each other with an insulation member 5c formed of rubber, glass or the like inserted between them, that is, a sandwich type of wire 5 is used.

Here, the wire 5 is extended outside of the molding material 34 and is then branched in the neighborhood of the two electric energizers 3a and 37. The copper plate or copper-system alloy plate 5a is then connected with the electric energizer 3a for supplying power to the wire electrode 1, and the copper plate or copper-system alloy plate 5b is connected to the electric energizer 37 for supplying power to the workpiece 2.

In the power supply device 30 that includes an air gap in the central portion thereof, if the wire 5 is formed in a disc-like shape and the outer periphery of the disc-shaped wire 5 is in contact with the terminal beds of the power supply device 30 and is thereby connected electrically with them, then the length of the power supply routes from a plurality of units disposed in the periphery of the wire 5 can be set constant, which reduces the resistance and the inductance of the circuit.

Also, with use of the disc-shaped wire 5 the power supply device 30 consisting of units can easily be arranged in a radial manner.

Figure 14A:
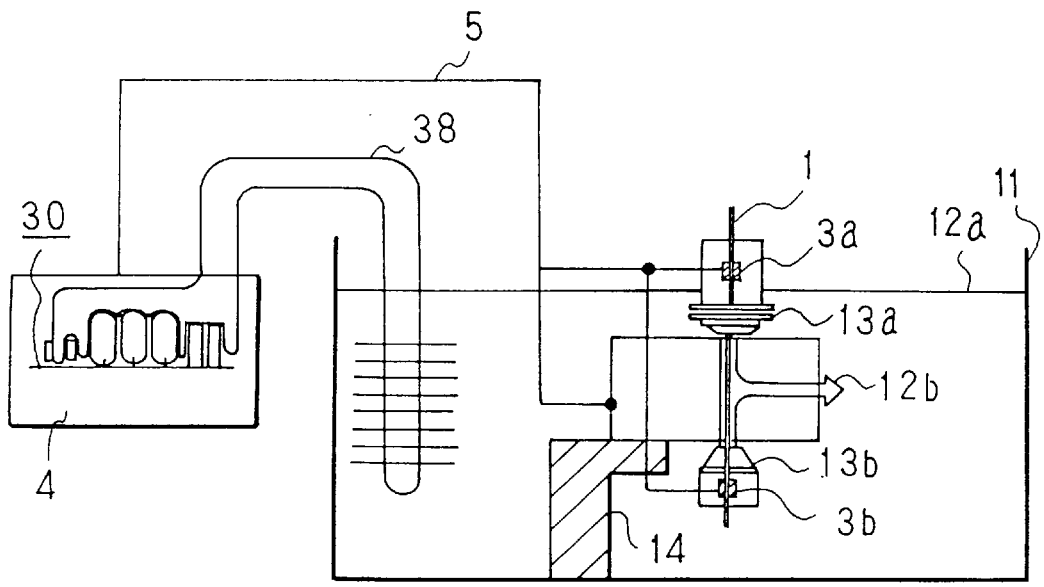
FIGS. 14A and 14B are explanatory views showing the use of a heat pipe in a power supply device according to another embodiment of the invention.

In the respective embodiments of the invention, the metal piece member 33 is cooled by use of the machining liquid. However, this is not limited to the metal piece member 33 but, for example, if the heat generated by the circuit component elements 32 passing through the highly conductive molding material 34 is transported up to the machining liquid vessel 11 by use of a narrow heat pipe 38, then the cooling of the circuit component elements 32 can be improved. As a result, the circuit component elements 32 can be mounted more densely and thus the power supply device 30 can be made compact (see FIG. 14A).

Figure 14B:
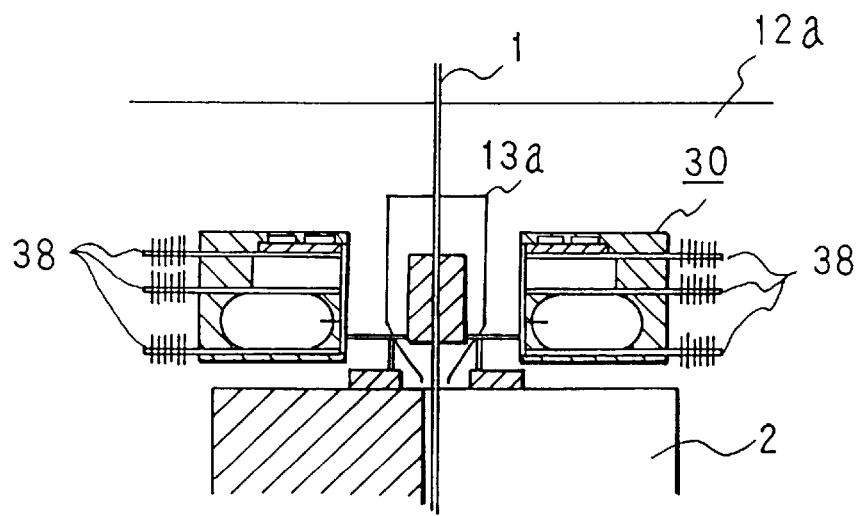
Figure 15:
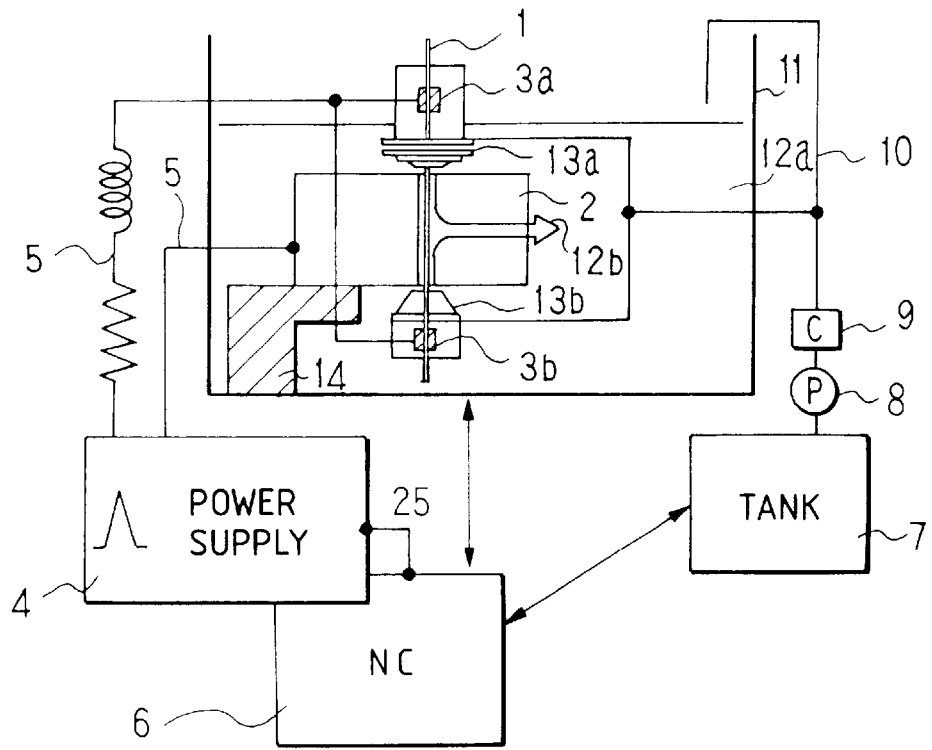
FIG. 15 is an explanatory view of a conventional wire electrical discharge machining device.
Figure 16:
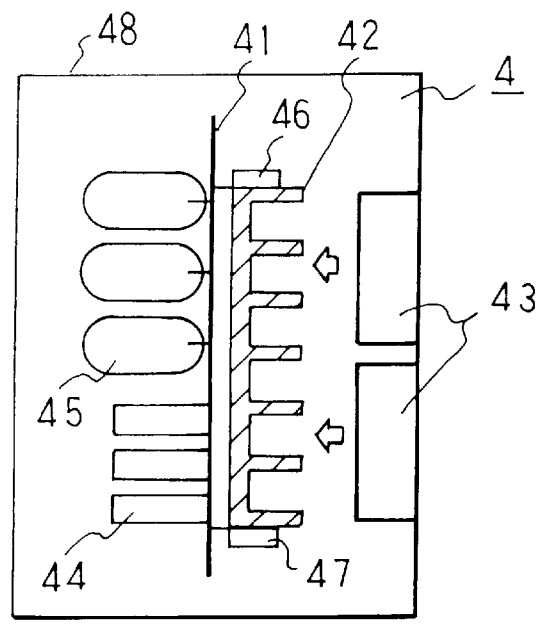
FIG. 16 is an explanatory view of another conventional wire electrical discharge machining device.
Figure 17:
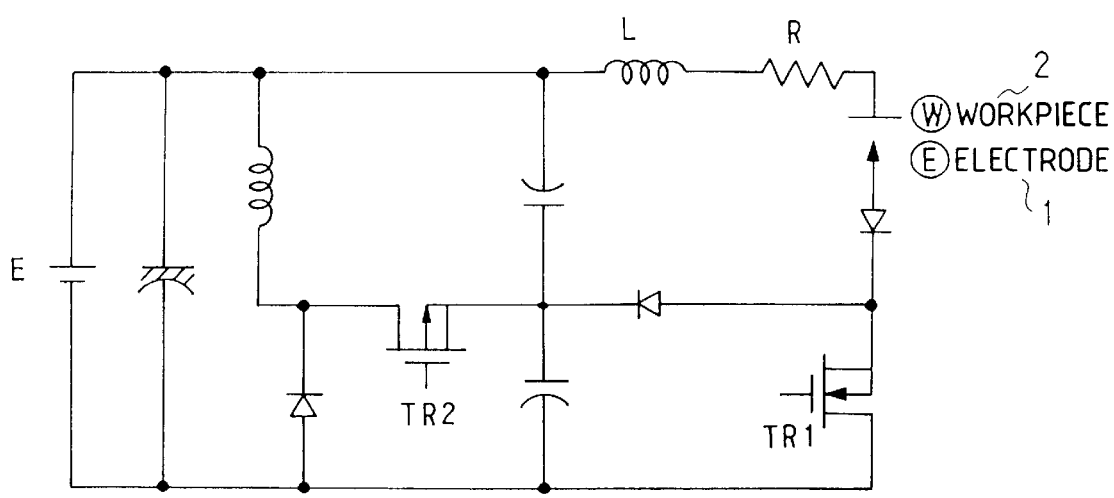
FIG. 17 is an explanatory view of a main circuit employed in a conventional wire electrical discharge machining device; and, FIGS. 18A and 18B are explanatory views of a gap box employed in a conventional wire electrical discharge machining device.
Figure 18A:
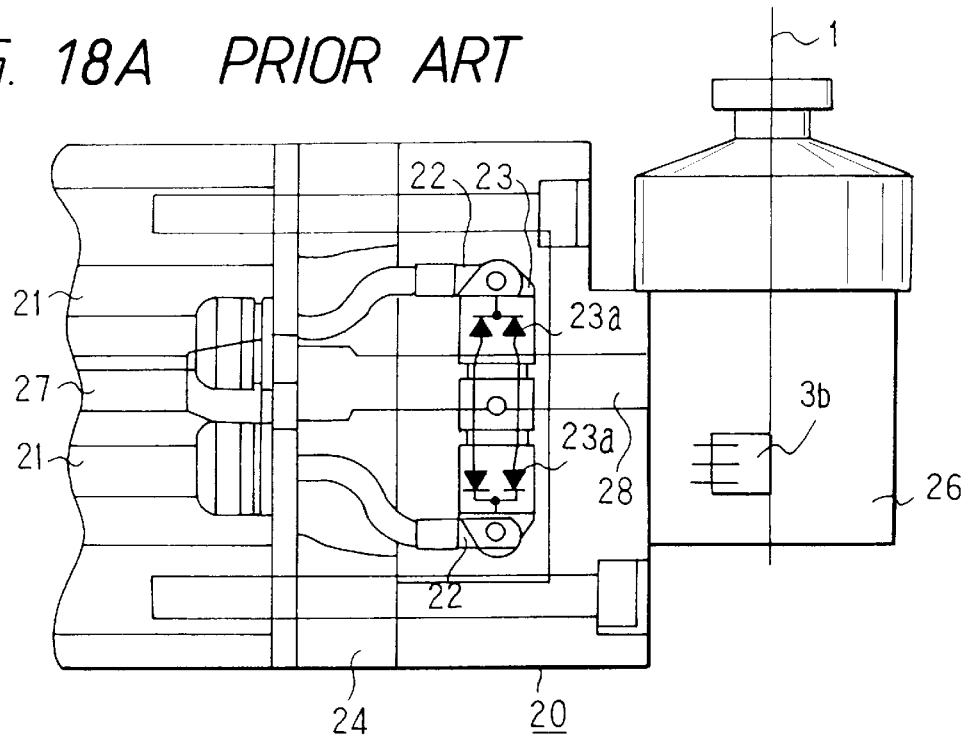
Figure 18B:
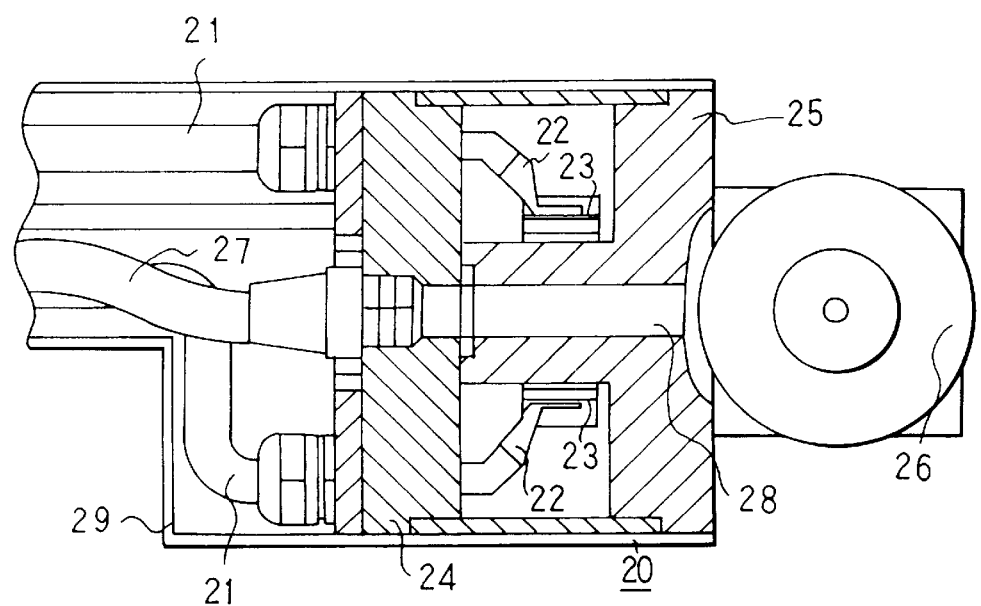

Also, the power supply device 30 can be immersed in the machining liquid and the heat of the circuit component elements 32 can be taken away by use of the heat pipe 38 (see FIG. 14B).

A power supply device for electrical discharge machining according to the invention comprises: circuit component elements for converting a voltage from a power supply to a given pulse voltage which can be supplied to a minute gap between an electrode and a workpiece so that electrical discharge can be generated in the minute gap; a substrate on which the circuit component elements are mounted; a highly thermally conductive metal piece member disposed opposed to the substrate and including a cavity portion therein, the cavity portion being fittable with the circuit component elements or being capable of holding the circuit component therein; and, cooling means for cooling heat, generated by the circuit component elements and conducted to the metal piece member, by use of a machining liquid supplied to the minute gap as a cooling medium. This makes it possible to cool the circuit component elements without using heat radiating fins or forced air cooling fans that have been used for cooling in the conventional power supply. The size and the cost of the device can thus be reduced.

Also, in a power supply device for electrical discharge machining according to the invention, since a molding material having high thermal conductivity is loaded into gaps formed between the circuit component elements mounted on the substrate and the inner wall surface of the cavity portion of the metal piece member, the heat generated by the circuit component elements can be positively transmitted to and cooled by the metal piece member, thereby improving the cooling characteristic of the power supply device.

This also prevents dew condensation on the circuit component elements which is caused when the circuit component elements are cooled by the machining liquid.

In the power supply device, a molding material is mixed with a filler. In the mother material of the molding material, there can be used one or more of epoxy resin, silicon resin, urethane resin, and polyester resin, which are each flowable at normal temperature or in a heated condition. As the filler, there can be used one or more of copper powder, aluminum powder, silver powder, gold powder, iron powder, stainless steel powder, brass powder, alumina powder, magnesium powder, crystal silica powder, aluminum nitride powder, silicon oxide powder, beryllium powder, silicon powder, boron nitride powder, zirconium silicate powder, silicon carbide powder, and diamond powder. Such a mixture makes it possible to provide a molding material which is high in thermal conductivity and is excellent in cooling efficiency, with the result that the heat generated by the circuit component elements can be transmitted to the metal piece member through such molding material.

In the power supply device, the metal piece member to be cooled by the cooling means is in part exposed on the outer-most surface of the power supply device. The circuit component elements mounted on the substrate and the substrate are sealed by the molding material and are then formed into a united body. This can eliminate the need for the conventional water-proofing treatment involved with the machining liquid, making it easy to take measures against water.

Since the power supply device is immersed in the machining liquid stored within the machining liquid vessel in which electric discharge is generated between the electrode and workpiece, the metal piece member and molding material are always cooled by the machining liquid, so that the cooling characteristic of the power supply device can be improved further.

Because a raised and recessed portion is formed on the outer-most surface of the metal piece member or the moldingly formed molding material that is in contact with the machining liquid, the surface area of the metal piece member or molding material is increased, further improving the cooling characteristic of the power supply device.

The substrate and the circuit component elements to be mounted on the substrate are divided into an arbitrary number of units and the units are then arranged radially with an air gap formed in the central portion thereof, before they are formed by molding. Due to this, the voltage supply routes or wires used to supply a voltage a machining gap for execution of electrical discharge can be set equal in length to one another and also the number of the wires can be reduced. As a result, the resistance value of the circuit can be reduced and the desired electrical discharge machining energy can be kept constant.

A wire electrode is inserted through the air gap formed in the central portion of the units. Wire electric energizers are used to supply a pulse voltage to the wire electrode, and units of the power supply device are arranged in a radial manner with respect to the wire electric energizers. This reduces the losses of the power supply circuiting present in a recent power supply device for electrical discharge machining, in which a high switching frequency and a high peak value of a current waveform for high speed machining are used, thereby being able to provide an efficient power supply device for electrical discharge machining.

Since the workpiece electric energizer for slidingly supplying power to the workpiece is disposed in the moldedly formed end portion of the power supply device or in the neighborhood thereof, the number of wires used can be reduced, which in turn can reduce the inductance of the circuit. As a result of this, the current waveform of the power supply device can be improved and the machining speed of the power supply device can be increased.

For connecting the wire electric energizer with the workpiece electric energizer, a connecting means composed of two thin plates of conductive members disposed in parallel with an insulation film between them is used, where one of the two conductive members is connected with the wire electric energizer, while the other is connected with the workpiece electric energizer. As a result, the lengths of the power supply routes from a plurality of units arranged in the peripheral portions of the power supply device can be set constant, making it possible to reduce the resistance value and inductance of the circuit. The current waveform of the power supply device is improved and the machining speed thereof can be increased.

What is claimed is:

1. A power supply device for electrical discharge machining comprising:

circuit component elements that convert a voltage from a power supply to a given pulse voltage which is supplied to a minute gap between an electrode and a workpiece so that electrical discharge is generated in said minute gap;

a substrate on which said circuit component elements are mounted;

a highly thermally conductive metal piece member disposed opposed to said substrate and including a cavity portion therein, said cavity portion being fittable with said circuit component elements or being capable of holding said circuit component elements therein, wherein said cavity portion has an inner wall surface; and cooling means for cooling heat, generated by said circuit component elements and transmitted to said metal piece member, by the use of a machining liquid supplied to said minute gap as a cooling medium.

2. A power supply device for electrical discharge machining as claimed in claim 1, further comprising:

a molding material having high thermal conductivity disposed between said circuit component elements mounted on said substrate and the inner wall surface of said cavity portion of said metal piece member.

3. A power supply device for electrical discharge machining as claimed in claim 2, wherein said molding material comprises:

at least one resin having fluidity at normal temperature or under a heated condition; and at least one filler having high thermal conductivity.

4. A power supply device for electrical discharge machining as claimed in claim 3, wherein said resin is selected from the group consisting of epoxy resin, silicone resin, urethane resin, and polyester resin, and wherein said filler is selected from the group consisting of copper powder, aluminum powder, silver powder, gold powder, iron powder, stainless steel powder, brass powder, alumina powder, magnesium powder, crystal silica powder, aluminum nitride powder, silicon oxide powder, beryllium powder, silicon powder, boron nitride powder, zirconium silicate powder, silicon carbide powder, and diamond powder.

5. A power supply device for electrical discharge machining as claimed in claim 2, wherein part of said metal piece member cooled by said cooling means is exposed to the outer-most surface of said power supply device, and wherein said circuit component elements mounted on said substrate as well as said substrate are tightly enclosed by said molding material and are formed into an integral body.

6. A power supply device for electrical discharge machining as claimed in claim 5, wherein said power supply device is immersed in a machining liquid stored within a machining liquid vessel in which an electrical discharge is generated between said electrode and said workpiece.

7. A power supply device for electrical discharge machining as claimed in claim 6, wherein a raised and recessed portion is formed on the outer-most surface of said metal piece member or on the outer-most surface of said moldingly formed integral body that is in contact with said machining liquid, thereby increasing the contact surface area of said metal piece member, or of said moldingly formed integral body, with said machining liquid.

8. A power supply device for electrical discharge machining as claimed in claim 5, wherein said substrate and said circuit component elements mounted on said substrate are divided into an arbitrary number of units and said units are disposed radially with an air gap formed in the central portion thereof, before said substrate and said circuit component elements are formed by molding.

9. A power supply device for electrical discharge machining as claimed in claim 8, further comprising:

a wire electrode inserted through said air gap formed in said central portion;

wire electric energizers disposed on said wire electrode for supplying a pulse voltage to said wire electrode; and wires connected with said wire electric energizers so that said wires extend radially with respect to said wire electric energizers.

10. A power supply device for electrical discharge machining as claimed in claim 8, further comprising:

a workpiece electric energizer for supplying electricity to a workpiece slidingly provided in the end portion of said moldingly formed integral body or in a neighboring portion thereof.

11. A power supply device for electrical discharge machining as claimed in claim 10, further comprising:

connecting means for connecting said wire electric energizers and said workpiece electric energizer, wherein said connecting means are composed of two thin plates of conductive members which are disposed in parallel to each other with an insulation film inserted therebetween, and wherein one of said conductive members is connected with said wire electric energizers, while the other is connected with said workpiece electric energizer.

* * * * *